United States Patent [19]

Obora et al.

[11] 4,431,767
[45] Feb. 14, 1984

[54] LUBRICATED AROMATIC POLYESTER COPOLYMER COMPOSITION

[75] Inventors: Masaki Obora; Yoshiteru Nagai, both of Kyoto, Japan

[73] Assignee: Unitika Ltd., Hyogo, Japan

[21] Appl. No.: 364,881

[22] Filed: Apr. 2, 1982

Related U.S. Application Data

[63] Continuation-in-part of Ser. No. 265,098, May 19, 1981, abandoned.

[30] Foreign Application Priority Data

Jun. 4, 1980 [JP] Japan ................................. 55-75740

[51] Int. Cl.³ ............................................. C08K 5/01
[52] U.S. Cl. ..................................................... 524/490
[58] Field of Search .............................. 524/324, 490

[56] References Cited

U.S. PATENT DOCUMENTS

| | | | |
|---|---|---|---|
| 3,378,532 | 4/1968 | Fritz et al. | 524/324 |
| 3,534,120 | 10/1970 | Ando et al. | 260/28 |
| 3,853,607 | 12/1974 | Iyengar et al. | 428/391 |
| 3,853,665 | 12/1974 | Gardziella | 260/28 |

FOREIGN PATENT DOCUMENTS 2077742  12/1981  United Kingdom ............... 524/490

OTHER PUBLICATIONS

Chem. Abs. vol. 71-102575z (1969) Mar. 5, 1969 Weissermel et al. (So. African 68-06237) "Thermoplastic Moulding Comp.".
Chem. Abs. vol. 72-32844f (1970) Jun. 20, 1970 Kern (South African 69-00101) "Thermoplastic Molding Comp ...".
Chem. Abs. vol. 91-40858w (1979) Kitaura et al., Toray Ind., Mar. 13, 1979, Japan 79-34446.

*Primary Examiner*—Joseph L. Schofer
*Assistant Examiner*—N. Sarofim
*Attorney, Agent, or Firm*—Oblon, Fisher, Spivak, McClelland & Maier

[57] ABSTRACT

A lubricated aromatic polyester copolymer composition comprises an aromatic polyester copolymer of a mixture of terephthalic acid and isophthalic acid or derivative thereof at a molar ratio of terephthalic acid group to isophthalic acid group of 9:1 to 1:9 and a bisphenol having the formula

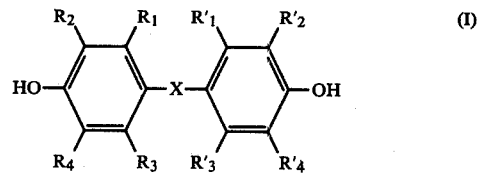

wherein —X— represents —O—, —S—, —SO$_2$—, —CO—, or either of an alkylene group or an alkylidene group which can be substituted by a hydrocarbon group having one or more carbon atom or a halogen atom or a halohydrocarbon group; and $R_1$, $R_2$, $R_3$, $R_4$, $R_1'$, $R_2'$, $R_3'$, and $R_4'$ respectively represent hydrogen atom, a halogen atom, hydroxyl group or a hydrocarbon group; and a specific lubricant comprising more than 70 wt. % of n-paraffin having carbon atoms of 16 to 40 at a ratio of 0.05 to 5 wt. % based on said polyester copolymer.

5 Claims, No Drawings

LUBRICATED AROMATIC POLYESTER COPOLYMER COMPOSITION

This application is a continuation-in-part of copending application Ser. No. 265,098, filed May 19, 1981 entitled "Lubricated Aromatic Polyester Copolymer Composition", now abandoned.

BACKGROUND OF THE INVENTION

1. Field of the Invention

The present invention relates to a lubricated aromatic polyester copolymer composition which is used for molding in an automatic releasing system.

2. Description of the Prior Art

Aromatic polyester copolymers obtained from terephthalic acid and isophthalic acid or functional derivatives thereof and bisphenol or a functional derivative thereof have been known.

As the processes for producing such aromatic polyester copolymer, the following processes have been known. An interfacial polymerization for mixing a solution of terephthalic acid dichloride and isophthalic acid dichloride in water immiscible organic solvent with a solution of a bisphenol in an alkaline aqueous solution to react them. A solution polymerization for reacting terephthalic acid dichloride and isophthalic acid dichloride with a bisphenol in an organic solvent. A melt polymerization for heating terephthalic acid and isophthalic acid with a bisphenol in the presence of acetic anhydride. A melt polymerization for heating phenyl esters of terephthalic acid and isophthalic acid with a bisphenol. A melt polymerization for heating terephthalic acid and isophthalic acid with a bisphenol in the presence of diallyl carbonate.

It is well-known that the resulting aromatic polyester copolymers have excellent characteristics such as excellent mechanical characteristics of tensile strength, bending strength, bending recovery coefficient and impact strength; excellent thermal characteristics of thermal deformation temperature and thermal decomposition; excellent electric characteristics of inherent resistance, insulation withstand, arc resistance, dielectric constant and dielectric loss; excellent fireproof property; excellent dimensional stability and excellent chemical resistance. Therefore, various applications can be considered for molded products, films, fibers and coated products of the copolymers obtained by an injection molding process, an extrusion molding process, a press molding process or various molding processes.

The aromatic polyester copolymers have excellent mechanical characteristics, electric characteristics, heat resistance and dimensional stability whereby the copolymers can be used for various productions of parts of precision machines and electric parts. Recently, automatic processes and energy saving processes in molding and processing of synthetic resins have been studied, especially various processes for automatic demolding of molded products have been developed, since synthetic resins have been used in a large quantity for parts of precision machines, electric parts and miscellaneous goods. The molded products must have nontackiness to the molds and less resistance in the demolding of the molded products in order to operate smoothly the automatic demolding machines. If the resistance in the demolding is great, the molded products may be deformed or damaged by the mechanical force to cause inferior value of goods. Sometimes, the molded products or the molds especially a projecting mechanism may be damaged. In order to reduce the resistance in the demolding, it has been considered to form a slant for demolding in the mold or to coat a releasing agent. In the molding of parts of precision machines or electric parts which require dimensional stability or the molding of molded products having complex configuration, the slant for demolding may not be given. In the molding of molded parts having certain configuration, a projecting mechanism especially a size and position of a projection pin is remarkably limited. Therefore, a releasing agent has been often used for improving demoldability. When excess of the releasing agent is coated, however, an appearance of the molded product may be inferior and a weld strength may be reduced to cause serious disadvantages that the characteristics of the resins can not be imparted.

It is important to improve the demoldability of the aromatic polyester copolymers having excellent characteristics for parts of precision machines and electric parts in view of the production of molded products having excellent original characteristics of the aromatic polyester copolymers.

A lubricant has been usually incorporated into a resin to improve demoldability of molded products. The effects of the lubricant are to reduce internal friction of the resin so as to improve the fluidity (internal lubricating effect) and to improve lubricating effect at an interface between the resin and the mold (external lubricating effect).

In order to improve the internal lubricating effect, a lubricant having high miscibility to the resin is usually used. In order to improve the external lubricating effect, a lubricant having low miscibility to the resin is usually used. However, mechanical characteristics and thermal characteristics are often deteriorated by the addition of a lubricant to resins.

It has been proposed to incorporate polyethylene or polypropylene especially low molecular weight polyethylene or polypropylene into the aromatic polyester copolymer so as to improve processability (internal lubricating characteristic) (Japanese Unexamined Patent Publication No. 71035/1974) or to improve demoldability (external lubricating characteristic) (Japanese Unexamined Patent Publication No. 3456/1975) without deterioration of the original mechanical characteristics and electric characteristics of the aromatic polyester copolymer. When polyethylene or polypropylene is incorporated into the aromatic polyester copolymer, cloud, devitrification or opaque of the molded product has been caused. The applications of the molded products have been disadvantageously limited in the fields for requiring transparency of the molded products.

SUMMARY OF THE INVENTION

It is an object of the present invention to improve demoldability of a molded product with excellent original mechanical and thermal characteristics of an aromatic polyester copolymer and also transparency.

It is another object of the present invention to provide an aromatic polyester copolymer composition which can be molded to produce a transparent molded product having no devitrification and excellent demoldability suitable for an automatic demolding process.

The foregoing and other objects of the present invention have been attained by providing a lubricated aromatic polyester copolymer composition which comprises an aromatic polyester copolymer of a mixture of terephthalic acid and isophthalic acid or derivative thereof at a molar ratio of terephthalic acid group to isophthalic acid group of 9:1 to 1:9 and a bisphenol having the formula

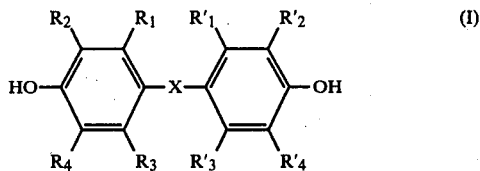

wherein —X— represents —O—, —S—, —SO$_2$—, —CO—, or either of an alkylene group or an alkylidene group which can be substituted by a hydrocarbon group having one or more carbon atom or a halogen atom or a halohydrocarbon group; and $R_1$, $R_2$, $R_3$, $R_4$, $R_1'$, $R_2'$, $R_3'$, and $R_4'$ respectively represent hydrogen atom, a halogen atom, hydroxyl group or a hydrocarbon group; and a specific lubricant comprising more than 70 wt.% of n-paraffin having carbon atoms of 16 to 40 at a ratio of 0.05 to 5 wt.% based on said polyester copolymer.

DETAILED DESCRIPTION OF THE PREFERRED EMBODIMENTS

The composition of the present invention has excellent mechanical and thermal characteristics and improved lubricating characteristic and transparency.

It is surprising fact that the compositions of the present invention comprising paraffin wax have remarkably superior transparency to those of the compositions comprising a polyolefin such as polyethylene and polypropylene as a lubricant.

The paraffin wax used in the present invention is crystalline paraffin obtained by separating and refining petroleum and is petroleum wax or natural paraffin which comprises n-paraffin as a main component and iso-paraffin and naphthene as a minor component and has a distribution of carbon atoms of $C_{16}$–$C_{40}$ preferably $C_{25}$–$C_{35}$ (molecular weight of 226–562 as n-paraffin) and a melting point of 110° F. to 170° F. preferably 135° F. to 155° F.

When the paraffin wax having a melting point of 110° F. (43° C.) to 170° F. (77° C.) especially 135° F. (57° C.) to 155° F. (69° C.) is incorporated, the demoldability and melt fluidity of the lubricated aromatic polyester copolymer composition are remarkably improved without any deterioration of mechanical and thermal characteristics of the aromatic polyester copolymer.

The paraffin wax used in the present invention is crystalline paraffin obtained by separating and refining petroleum and is petroleum wax or natural paraffin which comprises n-paraffine as a main component and iso-paraffin and naphthene as a minor component and has a distribution of carbon atoms of $C_{16}$–$C_{40}$ (molecular weight of 226–562 as n-paraffin).

The paraffin wax, as the specific lubricant is incorporated at a ratio of 0.05 to 5 wt.% preferably 0.1 to 3 wt.% especially 0.3 to 1 wt.% based on the aromatic polyester copolymer. When the content of the specific lubricant is less than 0.05 wt.%, the demoldability is not satisfactory whereas when it is more than 5 wt.%, excellent original characteristics of the aromatic polyester copolymer are lost to deteriorate seriously optical, mechanical and thermal characteristics. In view of balances of these characteristics and a molding for a thick molded product, it is preferable to have a content of the specific lubricant ranging from 0.1 to 3 wt.%. When the maintenance of the original characteristics of the aromatic polyester copolymer is especially important, it is preferable to give a content of the specific lubricant ranging from 0.3 to 1 wt.%.

The time and method of the incorporation of the paraffin wax, liquid paraffin, microcrystalline wax as the specific lubricant can be as follows.

(1) The specific lubricant is added to powdery aromatic polyester copolymer and the mixture is uniformly blended by a V shape blender, a supermixer etc. and is kneaded by an extruder to prepare pellets.

(2) The specific lubricant is dissolved in an organic solvent (a halogenated hydrocarbon such as methylene chloride, chloroform, tetrachloroethane is usually used as a solvent in a polymerization) before, during or after a polymerization for producing the aromatic polyester copolymer by an interface polymerization and the solvent is distilled off by certain process to produce a powdery aromatic polyester copolymer comprising paraffin and the mixture is kneaded by an extruder to prepare pellets.

(3) The pellets obtained by the process (1) are blended to pellets of the aromatic polyester copolymer comprising no special lubricant as the master batch process.

(4) The special lubricant is blended to the aromatic polyester copolymer as the dry blend process.

The aromatic polyester copolymers used in the present invention can be produced by using a mixture terephthalic acid and isophthalic acid or functional derivatives thereof and a bisphenol by an interface polymerization, a solution polymerization or a melt polymerization.

In the aromatic polyester copolymer obtained by using a mixture of a component having terephthalic acid group and a component having isophthalic acid group as the acid components, a molar ratio of terephthalic acid group to isophthalic acid group is in a range of 9:1 to 1:9.

The bisphenols used in the present invention have the formula (I). Suitable bisphenols (I) include of 4,4'-dihydroxydiphenyl ether, 4,4'-dihydroxy-2,2'-dimethyldiphenyl ether, 4,4'-dihydroxy-3,3'-dichlorodiphenyl ether, 4,4'-dihydroxydiphenyl sulfide, 4,4'-dihydroxydiphenyl sulfone, 4,4'-dihydroxydiphenyl ketone, bis(4-hydroxyphenyl)methane, 1,1-bis(4-hydroxyphenyl)ethane, 2,2-bis(4-hydroxyphenyl)propane, 1,1-bis(4-hydroxyphenyl)n-butane, di-(4-hydroxyphenyl)-cyclohexylmethane, and 1,1-bis(4-hydroxyphenyl)-2,2,2-trichloromethane.

A mixture of the bisphenols or a mixture of the bisphenol and a small amount of the other difunctional compound can be used.

It is possible to incorporate the other additives such as thermal decomposition inhibitor, an antioxidant and an ultraviolet absorption agent so as to improve the thermal resistance, the photoresistance and the oxidation resistance of the composition of the present invention. It is also possible to incorporate a pigment etc. in the composition of the present invention or to reinforce the composition by glass fiber etc.

The present invention will be further illustrated by certain examples and references which are provided for purposes of illustration only and are not intended to be limiting the present invention.

EXAMPLE 1 and 2, REFERENCE 1

An aromatic polyester copolymer was produced by an interface polymerization using a methylene chloride solution of a mixture of terephthalic acid dichloride and isophthalic acid dichloride at a molar ratio of 6:4 and an aqueous solution of sodium hydroxide containing bisphenol A. A logarithmic viscosity of the aromatic polyester copolymer in a mixed solvent of phenol and tetrachloroethane (6:4 by weight) at 25° C. was 0.69. Paraffin wax having a melting point of 58° C. (average carbon atoms of 27.8 ($C_{21}$–$C_{35}$)) was blended to the powdery aromatic polyester copolymer at a ratio shown in Table 1 in a V-shape blender. The mixture was kneaded in an Bent type extruder (L/D=18) at 300° C. to produce pellets. The pellets were dried at 120° C. for 16 hours and molded by an injection molding machine to prepare various specimens. Various characteristics of the specimens were measured. The results are shown in Table 1.

TABLE 1

| | Control | Exp. 1 | Exp. 2 | Ref. 1 |
|---|---|---|---|---|
| Amount of lubricant (wt. %) | 0 | 1 | 5 | 10 |
| Thermal characteristic: | | | | |
| Thermal deformation temperature (°C.) | 164 | 155 | 143 | 133 |
| Mechanical characteristic: | | | | |
| Tensile strength (kg/cm$^2$) | 740 | 730 | 670 | 550 |
| Elongation (%) | 55 | 45 | 39 | 30 |
| Izod Impact strength (kg. cm/cm. notch) | 6.0 | 5.7 | 4.5 | 2.8 |
| Optical characteristics: | | | | |
| Parallel light percent transmission (%) | 83 | 74 | 58 | 7 |

Each specimen having a diameter of 50 mm and a thickness of ⅛ inch was prepared by molding the pellets at a molding temperature of 320° C. under an injection pressure of 1200 kg/cm$^2$ into a mold at a temperature of 120° C. Each minimum setting time for releasable without any deformation of a molded product by a projecting pin was measured. The results are shown in Table 2.

Each spiral molding was carried out by using the pellets at a molding temperature of 320° C. under an injection pressure of 1000 kg/cm$^2$ into a mold at a temperature of 120° C. The results are shown in Table 2.

TABLE 2

| | Control | Exp. 1 | Exp. 2 | Ref. 1 |
|---|---|---|---|---|
| Amount of lubricant (wt. %) | 0 | 1 | 5 | 10 |
| Minimum setting time (sec.) | 44 | 13 | 11 | 11 |
| Spiral length (cm) | 13 | 19 | 25 | 40 |

As shown in Tables 1 and 2, the improvements of demoldability and melt fluidity were given without substantial deteriorations of the thermal characteristics, the mechanical characteristics and the optical characteristics in Examples.

EXAMPLES 3 to 7

The powdery aryl polyester copolymer of Example 1 was extruded by Bent type extruder at 300° C. to prepare pellets. Paraffin wax having a melting point of 70° C. (average carbon atoms of 34.5 ($C_{24}$–$C_{40}$)) (60 mesh powder) was dry-blended to the pellets and the pellets were dried at 120° C. for 16 hours and molded by an injection molding machine to prepare each specimen having a diameter of 50 mm and a thickness of ⅛ inch at a molding temperature of 320° C. under an injection pressure of 1200 kg/cm$^2$ into a mold at a temperature of 120° C. Each minimum setting time for releasable without any deformation of a molded product by a projecting pin was measured. The results are shown in Table 3.

TABLE 3

| | Control | Exp. 3 | Exp. 4 | Exp. 5 | Exp. 6 | Exp. 7 |
|---|---|---|---|---|---|---|
| Amount of lubricant (wt. %) | 0 | 0.05 | 0.1 | 0.3 | 0.5 | 1.0 |
| Minimum setting time (sec.) | 44 | 39 | 25 | 15 | 13 | 12 |

As shown in Table 3, the remarkable improvement of of demoldability was given by the incorporation of paraffin wax at a ratio of at least 0.05 wt.%.

According to tests of the resulting specimens, the thermal characteristics, the mechanical characteristics and the transparency of the specimens of Examples were excellent.

EXAMPLE 8 and REFERENCES 2 and 3

Paraffin was having a melting point of 62° C. (average carbon atoms of 29.5 ($C_{22}$–$C_{37}$)) was blended at a ratio of 3 wt.% to the powdery aromatic polyester copolymer of Example 1.

As references, each polyethylene having an average molecular weight of 3500 or 9000 (San Wax 131P manufactured by Sanyo Kasei K.K. and Hoechst Wax PA-190 manufactured by Hoechst Japan) was blended at a ratio of 3 wt.% to the powdery aromatic polyester copolymer. Each blend was extruded by a Bent type extruder at 300° C. to prepare pellets. The resulting master pellets were diluted for 10 times with the pellets obtained in Examples 3 to 7 and the mixed pellets were molded by an injection molding machine to prepare each specimen having a diameter of 50 mm and a thickness of ⅛ inch at a molding temperature of 320° C. under an injection pressure of 1200 kg/cm$^2$ into a mold at a temperature of 120° C. Each minimum setting time and each parallel light percent transmission of each specimen were measured. The results are shown in Table 4.

TABLE 4

| | Exp. 8 | Ref. 2 | Ref. 3 | Control |
|---|---|---|---|---|
| Lubricant | Paraffin wax mp. 62° C. | PE (MW 3500) | PE (MW 9000) | None |
| Amount of lubricant (wt. %) | 0.3 | 0.3 | 0.3 | — |
| Minimum setting time (sec.) | 14 | 11 | 11 | 44 |
| Parallel light percent transmission (%) | 80 | 23 | 15 | 83 |

As shown in Table 4, the compositions containing the low molecular weight polyethylene as the reference had lubricating effect, but had remarkably inferior optical characteristics to cause devitrification though the aromatic polyester copolymer itself had excellent optical characteristics. On the other hand, the composition containing the paraffin wax of the present invention had excellent optical characteristics.

EXAMPLES 9 to 12

The pellets used in the process of Examples 3 to 7 were admixed with the specific paraffin wax having a melting point of 58° C. (average carbon atoms of 26 ($C_{21}$–$C_{33}$)) (60 mesh powder) in a dry-blending. Each mixture was dried at 120° C. for 16 hours and extruded to mold each test piece having a diameter of 50 mm and a thickness of ⅛ inch by an injection molding machine at 320° C. under an injection pressure of 1000 kg/cm² and a mold heated at 120° C. In the molding operation, an inner pressure of the mold and a demolding resistance were measured by equipping a strain gauge with a projecting plate. The results are shown in Table 5.

TABLE 5

| | Amount of paraffin (wt. %) | Inner pressure of mold (kg/cm²) | Demolding resistance (kg) |
| --- | --- | --- | --- |
| Control | 0 | 823 | 127 |
| Example 9 | 0.01 | 819 | 98 |
| Example 10 | 0.5 | 825 | 65 |
| Example 11 | 1.0 | 811 | 61 |
| Example 12 | 5.0 | 830 | 60 |

As shown in Table 5, the remarkable improvement for demolding resistance was found in the case of the incorporation of more than 0.01 wt.% of the specific paraffin wax.

EXAMPLES 13 to 15 and REFERENCES 4 and 5

The pellets used in the process of Examples 3 to 7 were admixed with 1.0 wt.% of specific parafin waxes shown in Table 6 in a dry-blending. Each mixture was dried at 120° C. for 16 hours and extruded to mold each test piece having a diameter of 50 mm and a thickness of ⅛ inch by an injection molding machine at 320° C. under an injection pressure of 1000 kg/cm² and a mold heated at 120° C. In the molding operation, an inner pressure of the mold and a demolding resistance were measured by equipping a strain gauge with a projecting plate. The results are shown in Table 6.

TABLE 6

| | n-paraffin | | | Inner pressure of mold (kg/cm²) | Demolding resistance (kg) |
| --- | --- | --- | --- | --- | --- |
| | carbon atom number | | Melting point (°C.) | | |
| | average | range | | | |
| Example 13 | 26.0 | 16–33 | 55 | 825 | 65 |
| Example 14 | 28.3 | 22–38 | 60 | 815 | 63 |
| Example 15 | 32.6 | 25–40 | 66 | 808 | 60 |
| Reference 4 | 14.7 | 12–15 | 8 | 851 | 104 |
| Reference 5 | 44.3 | 41–56 | 78 | 848 | 97 |

We claim:

1. A lubricated aromatic polyester copolymer composition which comprises an aromatic polyester copolymer of a mixture of terephthalic acid and isophthalic acid or derivative thereof at a molar ratio of terephthalic acid group to isophthalic acid group of 9:1 to 1:9 and a bisphenol having the formula

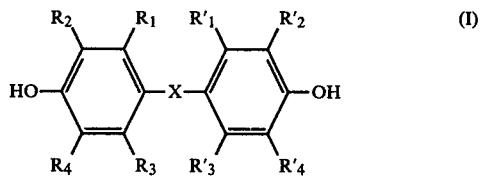

wherein —X— represents —O—, —S—, —$SO_2$—, —CO—, or either of an alkylene group or an alkylidene group which can be substituted by a hydrocarbon group having one or more carbon atom or a halogen atom or a halohydrocarbon group; and $R_1$, $R_2$, $R_3$, $R_4$, $R_1'$, $R_2'$, $R_3'$, and $R_4'$ respectively represent hydrogen atom, a halogen atom, hydroxyl group or a hydrocarbon group; and a specific lubricant comprising more than 70 wt.% of n-paraffin having carbon atoms of 16 to 40 at a ratio of 0.05 to 5 wt.% based on said polyester copolymer.

2. The lubricated aromatic polyester copolymer composition according to claim 1 wherein said aromatic polyester copolymer is formed using a bisphenol selected from the group consisting of 4,4'-dihydroxydiphenyl ether, 4,4'-dihydroxy-2,2'-dimethyldiphenyl ether, 4,4'-dihydroxy-3,3'-dichlorodiphenyl ether, 4,4'-dihydroxydiphenyl sulfide, 4,4'-dihydroxydiphenyl sulfone, 4,4'-dihydroxydiphenyl ketone, bis(4-hydroxyphenyl)methane, 1,1-bis(4-hydroxyphenyl)ethane, 2,2-bis(4-hydroxyphenyl)propane, 1,1-bis(4-hydroxyphenyl)n-butane, di-(4-hydroxyphenyl)cyclohexylmethane, and 1,1-bis(4-hydroxyphenyl)-2,2,2-trichloroethane.

3. The lubricated aromatic polyester copolymer composition according to claim 1 wherein said aromatic polyester copolymer is a copolymer of terephthalic acid and isophthalic acid and 2,2-bis(4-hydroxyphenyl)propane.

4. The lubricated aromatic polyester copolymer composition according to claim 1 which comprises said specific lubricant comprising n-paraffin having 16 to 40 carbon atoms as a main component and iso-paraffin as a minor component which is separated from petroleum.

5. The lubricated aromatic polyester copolymer composition according to claim 4 which comprises a specific lubricant comprising n-paraffin having 25 to 35 carbon atoms as a main component and iso-paraffin as a minor component which is separated from petroleum.

* * * * *